United States Patent [19]

Bulman et al.

[11] Patent Number: 5,052,774
[45] Date of Patent: Oct. 1, 1991

[54] CONNECTOR FOR A FIBER OPTIC CABLE

[75] Inventors: Jonathan M. Bulman, London; Glenton P. McFarlane, Middlesex, both of England

[73] Assignee: U.S. Philips Corp., New York, N.Y.

[21] Appl. No.: 500,440

[22] Filed: Mar. 27, 1990

[30] Foreign Application Priority Data

Mar. 31, 1989 [GB] United Kingdom ............... 8907263

[51] Int. Cl.$^5$ ............................................. G02B 6/36
[52] U.S. Cl. ............................................ 385/86; 385/76
[58] Field of Search ............... 350/96.20, 96.21, 96.22

[56] References Cited

U.S. PATENT DOCUMENTS 4,690,494 9/1987 Hirose et al. .................... 350/96.20

Primary Examiner—Frank Gonzalez
Attorney, Agent, or Firm—Ernestine C. Bartlett

[57] ABSTRACT

A connector (1) is provided for carrying an end portion of a fiber optic cable (2) to enable the cable to be conencted, via a coupling member, to another fiber optic cable. The connector (1) has an outer sleeve (3) having at one end (3a) connection means (4,26) for coupling to the coupling member and an inner sleeve (5) extending axially through the outer sleeve (3) so that one end (5a) of the inner sleeve is received within the outer sleeve (3) and the other (5b) of the inner sleeve (5) projects from the other end (3b) of the outer sleeve (3) to engage a protective sheath (20) of the cable (2). Locating means (6) are fixedly provided within the outer sleeve for limiting axial movement of the inner sleeve (5) within the outer sleeve (3). A support member for receiving a ferrule (9) supporting an optical fiber (11) of the cable (2) is slidably received within the outer sleeve (3) and biased by biasing means (16) acting on the locating means so that one end (8a) of the support member is caused to project from the one end (3a) of the outer sleeve (3). The other end (8b) of the support member (8) and the one end (5a) of the inner sleeve 5 have cooperating portions (12,13,14) allowing relative axial but not radial movement between the inner sleeve (5) and the support member (8).

14 Claims, 4 Drawing Sheets

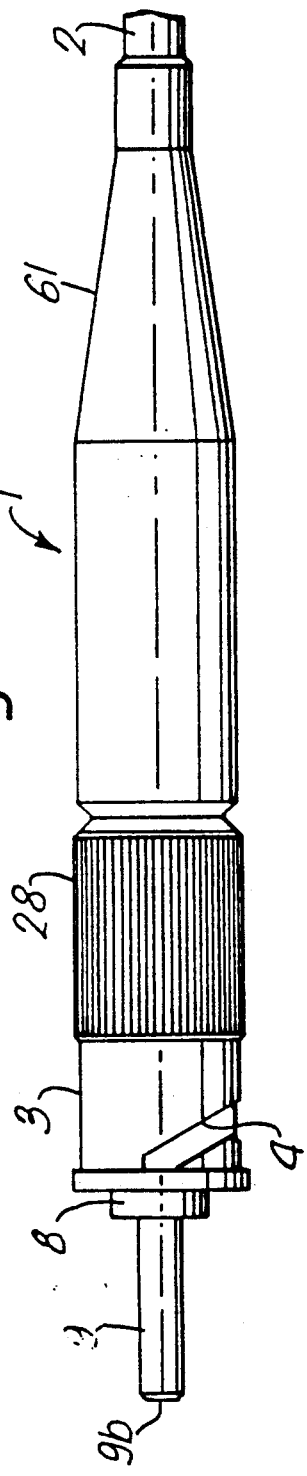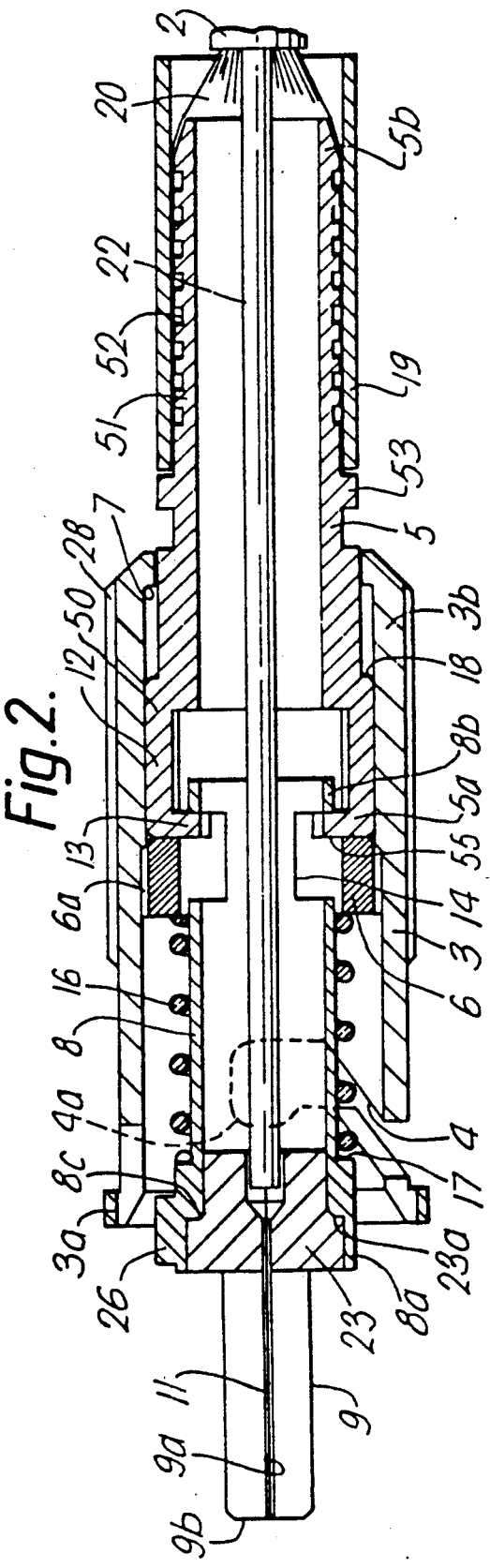

A CONNECTOR FOR A FIBER OPTIC CABLE

DESCRIPTION

1. Field of the Invention

This invention relates to a connector for carrying an end portion of a fiber optic cable to enable the cable to be connected, via a coupling member, to another fiber optic cable.

2. Background of the Invention

Various forms of such connector are known. A particular known form of connector known as an 'ST' type connector has an outer sleeve provided at one end with connection means in the form of the slot portion of a bayonet coupling arranged to engage with pins provided on one end of the coupling member. A support member for receiving a ferrule supporting an optical fiber of the cable is slidably received within the outer sleeve and is biased by a coil spring to cause the support member to project out of the outer sleeve so that when another fiber optic cable having a similar connector is coupled, via a similar bayonet coupling, to the other end of the connector, the end faces of the two ferrules are precisely aligned by a precision alignment sleeve of the coupling and are biased towards one another so as to ensure that the end faces abut to provide a good optical connection between the optical fibers.

The protective sheath surrounding the optical fiber of the cable is stripped from the end portion of the optical fiber to enable insertion into the ferrule. In this known 'ST' type of coupling, the protective sheath is secured to the other end of the support member. However, in use of such connectors, any axial force applied to the fiber optic cable will cause the ferrule to move, compressing the coil spring and causing separation of the end faces of the ferrules resulting in a reduction in the optical performance.

This known connector is also sensitive to lateral loads which again will reduce the quality of the coupling of the optical fibers and so adversely affect the optical performance of the coupling.

There are many circumstances where a fiber optic cable may experience such axial or lateral loads and, even if the load is only applied momentarily, optical transmission may be interrupted resulting in a corruption of the signal. Where heavy duty cables are used, the weight of the cable alone may affect the coupling and thus also affect the optical performance.

U.S. Pat. No. 4,302,938 describes a different type of connector which comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, and a support member for receiving a ferrule supporting an optical fiber of the cable, the support member being slidably received within the outer sleeve and biased by biasing means so that one end of the support member is caused to project from the one end of the outer sleeve, and the other end of the support member and the one end of the inner sleeve having cooperating portions for allowing relative movement between the inner sleeve and the support member.

In the connector described with reference to FIG. 5 of U.S. Pat. No. 4,320,938, the cooperating portions of the support member and the inner sleeve are provided by respective radially outwardly and radially inwardly extending flanges which in addition to allowing relative axial movement between the support member and the inner sleeve also enable relative rotation of the support member and inner sleeve. Furthermore, the biasing means described acts directly between the support member and the outer sleeve thus enabling loads applied to the outer sleeve to be transmitted to the ferrule supporting the optical fiber.

SUMMARY OF THE INVENTION

An aim of the present invention is to overcome or at least mitigate the above-mentioned problems by providing a connector which minimizes or at least reduces the effect loads applied to a fiber optic cable may have on the location of the end face of the ferrule carried by the connector.

According to a first aspect of the present invention there is provided a connector for carrying an end portion of a fiber optic cable to enable the cable to be connected, via a coupling member, to another fiber optic cable, which connector comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, and a support member for receiving a ferrule supporting an optical fiber of the cable, the support member being slidably received within the outer sleeve and biased by biasing means so that one end of the support member is caused to project from the one end of the outer sleeve, and the other end of the support member and the one end of the inner sleeve having cooperating portions for allowing relative movement between the inner sleeve and the support member, characterized in that locating means are fixedly provided within the outer sleeve for limiting axial movement of the inner sleeve within the outer sleeve and in that the locating means provides a bearing surface against which the biasing means acts to cause the one end of the support member to project from the one end of the outer sleeve.

A connector in accordance with the invention is simple to use and easy to connect. In addition, loads applied to the fiber optic cable carrying the connector are transmitted to the outer sleeve rather than to the support member so that the effect of the applied load on the support member, and thus on the location of the end face of the ferrule, is reduced which should reduce adverse effects on the optical performance of the coupling. In particular, the biasing means is arranged to bias the support member independently of the inner sleeve so that loads applied to the inner sleeve, for example to a protective sheath secured to the inner sleeve, are not transmitted directly to the ferrule.

One of the cooperating portions may comprise two axially extending arms having at their free ends inwardly directed hook members and the other of the cooperating portions may comprise two axially extending slots each slidably receiving a respective hook member. Usually, the arms extend axially from the one end of the inner sleeve and the slots extend axially along the other end of the support member.

In a second aspect, the present invention provides a connector for carrying an end portion of a fiber optic cable to enable the cable to be connected, via a coupling member, to another fiber optic cable, which connector comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, and a support member for receiving a ferrule supporting an optical fiber of the cable, the support member being slidably received within the outer sleeve and biased by biasing, means so that one end of the support member is caused to project from the one end of the outer sleeve, and the other end of the support member and the one end of the inner sleeve having cooperating portions for allowing relative movement between the inner sleeve and the support member, characterized in that one of the cooperating portions is shaped to provide two inwardly directed hook members and the other of the cooperating portions comprises two axially extending slots each slidably receiving a respective hook member. The hook members and axially extending slots forming the cooperating portions in this aspect of the invention enable relative axial movement of the inner sleeve and support member while avoiding relative rotation of the inner sleeve and support member which might otherwise place undue strain on the optical fiber.

The locating means may comprise a locating ring fixedly received within the outer sleeve. The other end of the support member is normally slidably received within the locating ring and the support member biased by a spring mounted by the support member and abutting against the locating ring. The locating means usually also comprises an inwardly directed flange provided at the other end of the outer sleeve for cooperating with a shoulder provided on the inner sleeve.

The other end of the inner sleeve may have a gripping surface and a crimping sleeve may be provided which, in use, surrounds the gripping surface and is crimped to secure the protective sheath to the inner sleeve.

The present invention also provides a method of coupling a fiber optic cable comprising a sleeved optical fiber encased in a protective sheath with an end portion of the optical fiber projecting beyond the sleeve to a connector in accordance with the first or second aspect, which method comprises inserting the biasing means into the outer sleeve, sliding the locating means onto the other end of the support member, causing the cooperating portions of the inner sleeve and the support member to engage one another, inserting the assembly of the locating means, support member and inner sleeve into the outer sleeve so that the locating means forms an interference fit within the outer sleeve, mounting the exposed end portion of the optical fiber in a ferrule, inserting the ferrule-carrying fiber optic cable into the connector so that the cable extends freely through the inner sleeve, and securing the protective sheath to the inner sleeve by crimping the crimping sleeve onto the gripping surface of the inner sleeve.

BRIEF DESCRIPTION OF THE DRAWINGS

An embodiment of the invention will now be described, by way of example, with reference to the accompanying drawings, in which:

FIG. 1 is a side elevational view of a connector in accordance with the invention;

FIG. 2 is a longitudinal cross-sectional view of the connector shown in FIG. 1;

It should be understood that the Figures are not to scale and that in the interests of clarity the dimensions of certain parts may have been relatively enlarged or reduced.

DETAILED DESCRIPTION OF PREFERRED EMBODIMENTS

Figure 4:
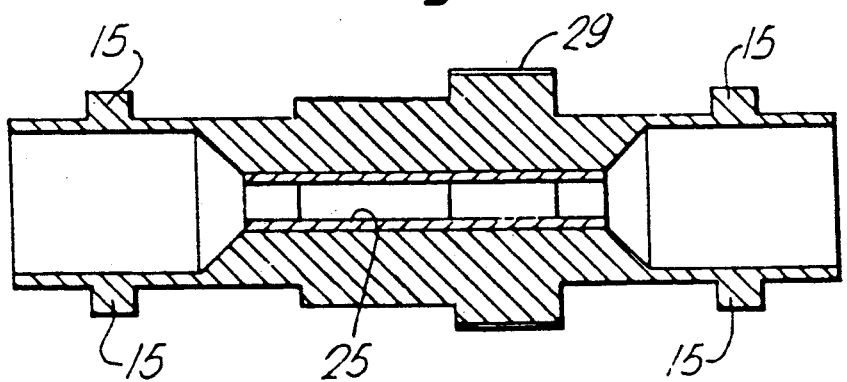
FIG. 4 is a longitudinal cross-sectional view of the coupling member shown in FIG. 3.
Figure 5:
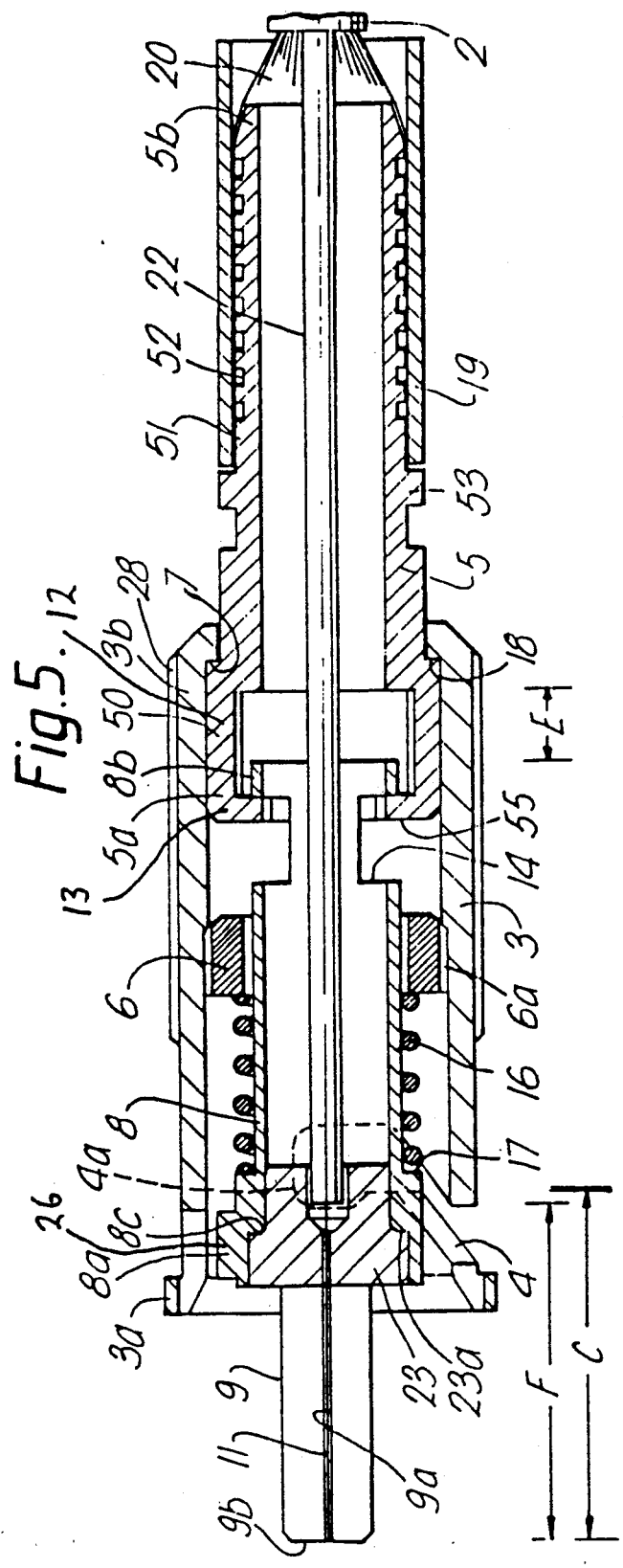
FIG. 5 is a cross-sectional view similar to FIG. 3 showing the condition of the connector when coupled to a coupling member (not shown in FIG. 5) similar to that shown in FIGS. 3 and 4.

Referring now to the drawings, there is shown in FIGS. 1, 2 and 5 a connector 1 for carrying an end portion of a fiber optic cable 2 to enable the cable to be connected, via a coupling member 10 (FIGS. 3 and 4), to another fiber optic cable. The connector 1 comprises an outer sleeve 3 having at one end 3a connection means 4,26 for coupling to the coupling member 10, an inner sleeve 5 extending axially through the outer sleeve 3 so that one end 5a of the inner sleeve is received within the outer sleeve 3 and the other end 5b of the inner sleeve 5 projects from the other end 3b of the outer sleeve 3 to engage a protective sheath 20 of the cable 2, locating means 6 fixedly positioned within the outer sleeve 3 for limiting axial movement of the inner sleeve 5 within the outer sleeve 3 and a support member 8 for receiving a ferrule 9 supporting an optical fiber 11 of the cable 2, the support member 8 being slidably received within the outer sleeve 3 and biased, by biasing means 16 acting against the locating means 6, so that one end 8a of the support member is caused to project from the one end 3a of the outer sleeve 3, and the other end 8b of the support member 8 and the one end 5a of the inner sleeve 5 having cooperating portions 12,13,14 allowing relative axial movement between the inner sleeve 5 and the support member 8.

Turning now specifically to FIG. 2, the outer sleeve 3 is generally cylindrical and is precision machined in, for example, stainless steel. The connection means is in the form of two shaped slots 4 (only one of which is visible in FIGS. 1, 2 and 5 provided in the outer sleeve 3, which slots 4 are arranged to engage, as will be described below, pins 15 provided on a suitable coupling member 10 (such as the one shown in FIGS. 3 and 4) to form a conventional bayonet type coupling.

The inner sleeve 5 is similarly generally cylindrical and is again precision machined in, for example, stainless steel. The one end 5a of the inner sleeve 5 has two diametrically opposed longitudinally extending arms 12 provided at their free ends with radially inwardly directed hook members 13 which engage in longitudinally extending slots 14 formed in the other end 8b of the support member 8 so as to define the cooperating portions of the inner sleeve 5 and the support member 8 which allow relative axial but not radial (that is rotational) movement between the inner sleeve 5 and the support member 8. The extent of relative axial movement E allowed between the inner sleeve 5 and support member 8 will be determined by the axial lengths of the slots 14 and of the hook members 13 and in a typical connector may be 1.5 mm (millimeters).

The support member 8 is itself precision machined from, in this example, brass and is slidably mounted within a locating ring 6 forming the locating means. The locating ring 6 has a knurled outer surface 6a and as will be explained below is inserted into the outer sleeve 3 so as to provide an interference fit with the inner surface of the outer sleeve 3. The locating ring 6 is thus axially fixed relative to the outer sleeve 3 and provides an abutment against which biasing means in the form of a coil spring 16 located on the support member abut to enable the spring to push on a shoulder 17 of the support member 8 to cause the support member 8 to project from the one end 3a of the outer sleeve 3 so as to enable, as will be described below, a good optical connection while allowing the ferrule 9 to be biased independently of the outer sleeve 3.

Although not shown in FIG. 2, a washer may be provided between the locating ring 6 and the coil spring 16 to assist in preventing movement of the coil spring 16 into the space defined by the locating ring 6.

The inner sleeve 5 is retained within the outer sleeve 3 by means of a radially inwardly directed flange 7 provided at the other end 3b of the outer sleeve 3 which is arranged to cooperate with a shoulder 18 (see FIG. 5) of an enlarged end portion 50 of the inner sleeve so as to prevent removal of the inner sleeve 5 from the outer sleeve 3. The remaining narrower diameter portion 51 of the inner sleeve 5 projects, as mentioned above, beyond the flange 7 to engage the protective sheath 20 of the fiber optic cable 2. The flange 7 together with the locating ring 6 thus limits the maximum axial travel of the inner sleeve 5 relative to the outer sleeve 3.

The inner sleeve 5 is, however, free to rotate about its axis within the outer sleeve 3. The nature of the cooperating portions 12,13,14 is, as described above, such that the support member 8 and the inner sleeve 5 rotate together facilitating as will be seen below coupling of the connector 1 to the coupling member 10.

The portion 51 of the inner sleeve 5 which extends beyond the flange 7 has a series of parallel grooves 52 extending circumferentially around its outer surface which, as will be described below, are arranged to cooperate with a crimping sleeve 19 to engage a protective sheath of the fiber optic cable 2.

In order to assemble the connector 1, the coil spring 16 is first placed on the support member 8 so as to rest on the shoulder 17. The knurled locating ring 6 is then slid into the other end 8b of the support member 8 and moved axially against the bearing force of the coil spring 16 to compress the spring 16 and so expose the slots 14. The inner sleeve 5 is then located with respect to the support member 8 so that the hook members 13 engage in respective ones of the slots 14 and the locating ring 6 is released so that the biasing force of the spring 16 pushes the hook members 13 against the ends of the slots 14 adjacent the other end 8b of the support member 8 to hold the support member 8 and the inner sleeve 5 firmly together.

The assembly of the support member 8 and inner sleeve 5 is then inserted into the one end 3a of the outer sleeve 3 and, using a suitable insertion tool, the locating ring 6 is forced into the outer sleeve 3 until it forms an interference fit with the inner surface of the outer sleeve 3 thus axially fixing the position of the combination of the support-member 8 and inner sleeve 5 relative to the outer sleeve 3 while still allowing the combination of the support member 8 and the inner sleeve 5 to rotate about their common axis relative to the outer sleeve 3.

To enable the fiber optic cable 2 to be connected to the connector 1, an outer plastic sleeving (not shown) of the cable 2 is stripped from a predetermined length at the end portion of the cable to expose the protective sheath 20 of the cable 2 which in this example is formed as a bundle of fibers comprising a plastic material available commercially under the trademark Kevlar. The inner plastics sleeving 22 sheathing the optical fiber 11 is then carefully stripped from the end portion of the cable 2 and the exposed end portion of the optical fiber 11 is then inserted into the axial bore 9a of a precision formed ferrule 9, the bore 9a having previously been filled with a suitable adhesive. After conventional curing of the adhesive to set the optical fiber 11 firmly within the ferrule, the end face 9b of the ferrule is polished in conventional manner.

The end portion of the fiber optic cable 2 carrying the ferrule 9 is then inserted into the connector so that the ferrule 9 projects as shown in FIGS. 2 and 5 from the one end 8a of the support member 8 into which a plastic, for example PTFE, sleeve (not shown) had previously been inserted. A metal collar 23 having shoulders 23a cooperating with internal shoulders 8c provided on the inner surface of the support member 8 is then inserted into the one end 8a of the support member 8 to hold the ferrule 9 securely fixed in position both axially and radially with respect to the support member 8. As an alternative to using a push-fit metal collar 23, the metal collar may make a screw-threaded connection with the one end 8a of the support member 8.

The exposed portion of the protective sheath 20 is then positioned about the grooved surface of the end portion 52 of the inner sleeve 5. A crimping sleeve 19 is then slipped onto the end portion 52 to abut a flange 53 of the end portion 52 so as to surround the protective sheath 20 and is then crimped in place to hold the protective sheath 20 firmly with respect to the inner sleeve 5. A protective rubber casing 61 (FIG. 1), which may have been previously positioned on the cable 2, is then pulled into position as shown in FIG. 1 to rest securely against the flange 53 so as to cover the exposed portion of the protective sheath 20 and an adjacent portion of the cable 2. FIG. 2 illustrates the relative locations of the component parts of the connector when the connector 1 has just been assembled.

Figure 3:
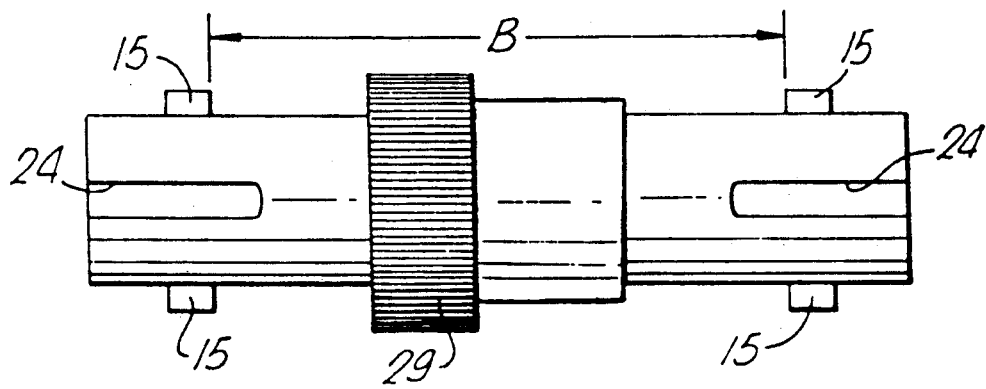
FIG. 3 is a side elevational view of a coupling member suitable for use with the connector shown in FIG. 1.

FIGS. 3 and 4 illustrate a suitable coupling member 10 for enabling the fiber optic cable 2 carried by the connector 1 to be optically coupled to another fiber optic cable 2 carried by a similar connector. As can be seen from FIG. 3, the coupling member 10 comprises a tubular member precision machined from, for example, stainless steel having at each end connection means in the form of two diametrically opposed pins 15 and a locating slot 24 which cooperate with the connection means 4 of the connectors 1 to provide conventional bayonet type couplings. The coupling member 1 contains as shown in the cross-sectional view of FIG. 4 a precision alignment sleeve 25 which is precision machined so as to enable precise alignment of the two opposed ferrules 9 and thus of the optical fibers 11.

In order to connect the connector 1 to the coupling member 10 shown in FIGS. 3 and 4, the locating slot 24 at one end of the coupling member 10 is first aligned with a locating pin 26 provided on the outer surface of the support member 8 while at the same time the locating pins 15 are aligned with the shaped slots 4 by effecting relative rotation of the outer sleeve 3 and the support member 8. Once the pins 26 and 15 have been located in their respective slots 24 and 4, the connector 1 and coupling member 10 are pushed towards one another so that the pins 15 are forced along the shaped slots 4 causing rotation of the coupling member 10 relative to the connector 1 and the support member 8 is pushed backwards against the biasing force of the coil spring 16 until the pins 15 are received in locating recesses 4a at the ends of the shaped slots 4 so as to hold the connector 1 firmly into a releasable connection with the coupling member 10. A second connector 1 may similarly be inserted into the other end of the coupling member 10.

The outer surfaces of the outer sleeve 3 and the coupling member 10 may be provided with knurled regions 28 and 29, respectively, to facilitate gripping during coupling.

FIG. 5 shows the relative locations of the components of the connector 1 when the connector 1 has been coupled as described above to the coupling member 10. As can be seen from a comparison of FIGS. 2 and 5, the coupling of the connector 1 to the coupling member 10 compresses the coil spring 16 which exerts a biasing force on the support member 8 to ensure that the end face of the ferrule 9 and thus the end face of the optical fiber 11 is biased against the end face of the other optical fiber 11 to provide a good optical connection.

As shown in FIG. 5, the cable 2 has been subjected to a tensile load pulling the inner sleeve 5 back to straighten the cable 2 so that the shoulder 18 abuts the flange 7. The axial length of travel E allowed by the cooperating portions 12,13 and 14 of the inner sleeve 5 relative to the support member 8 is at least equal to and preferably slightly greater than the distance which the inner sleeve 5 can travel before the shoulder 18 abuts the flange 7 so that pulling of the inner sleeve 5 back against the flange or stop 7 does not cause any movement of the support sleeve 8 so that the end faces of the ferrules 9 remain in contact.

The rearmost position of the support member 8 (and thus of the ferrule 9), that is the maximum distance the support member 8 can be pushed back against the biasing force of the spring 16, is determined by the end face 55 of the enlarged portion 50 of the inner sleeve 5 which, when the shoulder 18 abuts the flange 7, provides a stop limiting backward travel of the support member 8 against the biasing force of the spring 16.

Although not shown in the Figures, when the support member 8 is in its rearmost position, the optical fiber 11 takes up a curved path, the relative maximum allowable distances of travel E of the support member 8 and inner sleeve 5 being such that the bending of the optical fiber is not sufficient to place excessive mechanical stress and strain on the optical fiber or to impair its optical performance.

The length F in FIG. 5 is less than half the distance between the pins 15 of the in-line coupling member 10 (the distance B in FIG. 3) so that the total relative movement between the ferrule support member 8 and the outer sleeve 3 is sufficient to ensure that the ferrule end faces 9b of two connectors 1 coupled to the coupling member 10 are held in contact only by the force of the coil springs 16.

If, however, the connector 1 was coupled to an active device receptacle having an end stop (not shown) then the length C (FIG. 5) from the end face of the ferrule 9 to the closest edge of the shaped slot 4 should, of course, be less than the distance between the pin 15 and the end stop to enable operation of the bayonet coupling.

In use of a coupling in accordance with the invention if any load is placed on the fiber optic cable 2, the force applied by the load is transmitted via the protective sheath 20 to the inner sleeve 5, which as will be appreciated from FIGS. 2 and 5, once the shoulder 18 abuts the flange 7 transmits the applied load to the outer sleeve 3 rather than to the independently biased support member 8 carrying the ferrule 9 so that the effect of loads applied to the cable 2 on the support member 8 and thus on the ferrule 9 is minimized or at least reduced so reducing the adverse effect of such applied loads on the optical performance of the coupling.

Figure 6:
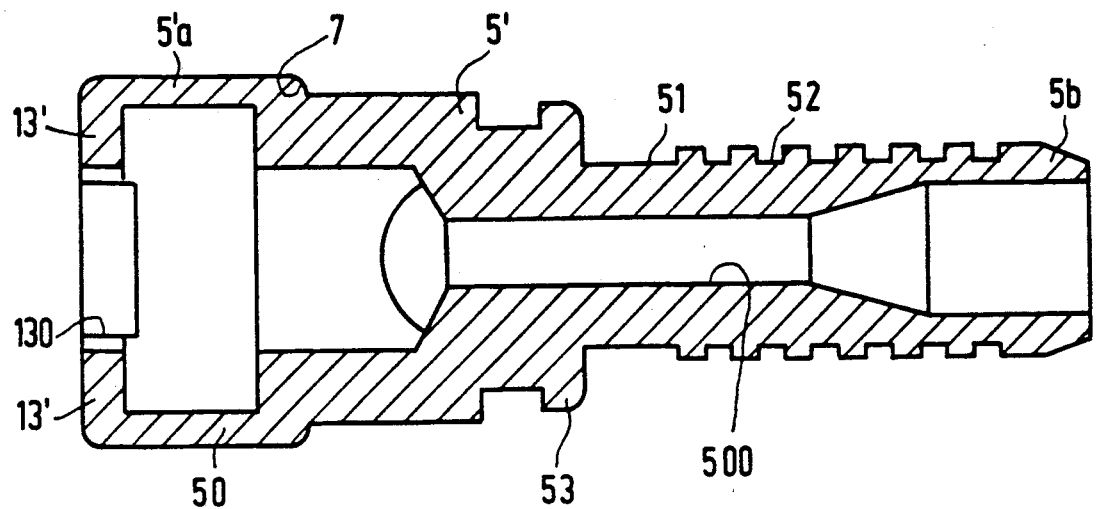
FIG. 6 is a cross-sectional view of a modified form of the inner sleeve of a connector in accordance with the invention.
Figure 7:
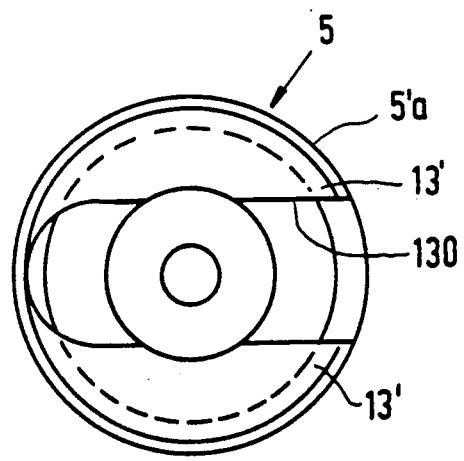
FIG. 7 is a view from one end of the inner sleeve shown in FIG. 6.

FIGS. 6 and 7 illustrate a modified form of the inner sleeve 5' of the connector shown in FIGS. 1 to 3. In the modified form of the inner sleeve 5' shown in FIGS. 6 and 7, the radially inwardly extending hook members 13' are provided not on the ends of two diametrically opposed longitudinally extending arms 12 of the inner sleeve 5' but rather by means of a shaped slot 130 formed at the one end 5'a of the inner sleeve 5'. In other respects, the radially inwardly extending hook members 13' function in the same manner as the hook members 13 shown in FIGS. 1 to 3. In addition, as can been seen by a comparison of FIGS. 2 and 6, the diameter of the internal bore 500 of the modified sleeve 5' is much smaller so that it inhibits bending of the optical fiber 11 along a curved path as described above but rather encourages the optical fiber 11 to retract into the cable 2.

It should, of course, be appreciated that a connector in accordance with the invention may be used with any suitable form of coupling member and that connection means other than bayonet couplings may be used.

From reading the present disclosure, other modifications will be apparent to persons skilled in the art. Such modifications may involve other features which are already known in the art and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly.

We claim:

1. A connector for carrying an end portion of a fiber optic cable to enable the cable to be connected, via a coupling member, to another fiber optic cable, which connector comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, a support member for receiving a ferrule supporting an optical fiber of the cable, the support member being slidably received within the outer sleeve and biased by biasing means so that one end of the support member is caused to project from the one end of the outer sleeve, the other end of the support member and the one end of the inner sleeve having cooperating portions for allowing relative movement between the inner sleeve and the support member, and locating means fixedly provided within the outer sleeve, the locating means providing a bearing surface against which the biasing means acts to cause the one end of the support member to project from the one end of the outer sleeve.

2. A connector according to claim 1, wherein the locating means comprises a location ring fixedly received within the outer sleeve.

3. A connector according to claim 2, wherein the other end of the support member is slidably received within the locating ring and the support member is biased by a spring mounted on the support member and abutting against the locating ring.

4. A connector according to claim 1, wherein an inwardly directed flange is provided at the other end of the outer sleeve for cooperating with a shoulder provided on the inner sleeve.

5. A connector according to claim 1, wherein the outer end of the inner sleeve has a gripping surface and a crimping sleeve is provided which, in use, surrounds the gripping surface and is crimped to secure the protective sheath to the inner sleeve.

6. A connector for carrying an end portion of a fiber optic cable to enable the cable to be connected, via a coupling member, to another fiber optic cable, which connector comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, and a support member for receiving a ferrule supporting an optical fiber of the cable, the support member being slidably received within the outer sleeve and biased by biasing means so that one end of the support member is caused to project from the one end of the outer sleeve, and the other end of the support member and the one end of the inner sleeve having cooperating portions for allowing relative movement between the inner sleeve and the support member, wherein one of the cooperating portions is shaped to provide two inwardly directed hook members and the other of the cooperating portions comprises two axially extending slots each slidably receiving a respective hook member.

7. A connector as claimed in claim 6, wherein the arms extend axially from the one end of the inner sleeve and the slots extend axially along the other end of the support member.

8. A connector according to claim 6, wherein locating means are fixedly provided within the outer sleeve for limiting axial movement of the inner sleeve within the outer sleeve and the locating means provides a bearing surface against which the biasing means acts to cause the one end of the support member to project from the one end of the outer sleeve.

9. A connector as claimed in claim 8, wherein the arms extend axially from the one end of the inner sleeve and the slots extend axially along the other end of the support member.

10. A connector as claimed in claim 8, wherein the locating means comprises a location ring fixedly received within the outer sleeve.

11. A connector for carrying an end portion of a fiber optic cable to enable the cable to be connected, via a coupling member, to another fiber optic cable, which connector comprises an outer sleeve having at one end connection means for coupling to the coupling member, an inner sleeve extending axially through the outer sleeve so that one end of the inner sleeve is received within the outer sleeve and the other end of the inner sleeve projects from the other end of the outer sleeve to engage a protective sheath of the cable, a support member for receiving a ferrule supporting an optical fiber of the cable, the support member being slidably received within the outer sleeve and biased by biasing means so that one end of the support member is caused to project from one end of the outer sleeve, the other end of the support member and the one end of the inner sleeve having cooperating portions for allowing relative movement between the inner sleeve and the support member, wherein:
   one of the cooperating portions comprises two axially extending arms having at their free ends inwardly directed hook members and the other of the cooperating portions comprises two axially extending slots each slidably receiving a respective hook member; and
   locating means are fixedly provided within the outer sleeve for limiting axial movement of the inner sleeve within the outer sleeve, the locating means providing a bearing surface against which the biasing means acts to cause the one end of the support member to project from the one end of the outer sleeve.

12. A connector according to claim 11, wherein the arms extend axially from the one end of the inner sleeve and the slots extend axially along the other end of the support member.

13. A connector as claimed in claim 11, wherein the locating means comprises a location ring fixedly received within the outer sleeve.

14. A method of coupling a fiber optic cable comprising a sleeved optical fiber encased in a protective sheath with an end portion of the optical fiber projecting beyond the sleeve to a connector which method comprises inserting biasing means into an outer sleeve, sliding locating means onto one end of a support member, causing cooperating portions of an inner sleeve and the support member to engage one another, inserting the assembly of the locating means, support member and inner sleeve into the outer sleeve so that the locating means forms an interference fit within the outer sleeve to limit axial movement of the inner sleeve within the outer sleeve and provide a bearing surface against which the biasing means acts to cause one end of the support member to project from one end of the outer sleeve, mounting an exposed end portion of the optical fiber in a ferrule, inserting the ferrule-carrying fiber optic cable into the connector so that the cable extends freely through the inner sleeve, and securing the protective sheath to the inner sleeve by crimping a crimping sleeve onto a gripping surface of the inner sleeve.

* * * * *